United States Patent
Moon

(10) Patent No.: US 8,244,173 B2
(45) Date of Patent: Aug. 14, 2012

(54) RF REPEATER

(75) Inventor: Young-Chan Moon, Suwon-si (KR)

(73) Assignee: KMW Inc., Youngchon-ri, Tongtan-myon, Hwasong-shi, Kyonggi-do (KR)

( * ) Notice: Subject to any disclaimer, the term of this patent is extended or adjusted under 35 U.S.C. 154(b) by 565 days.

(21) Appl. No.: 12/214,397

(22) Filed: Jun. 18, 2008

(65) Prior Publication Data

US 2008/0299898 A1 Dec. 4, 2008

Related U.S. Application Data

(63) Continuation of application No. PCT/KR2006/005698, filed on Dec. 26, 2006.

(30) Foreign Application Priority Data

Dec. 26, 2005 (KR) .............................. 2005-129810

(51) Int. Cl.
*H04B 3/36* (2006.01)
*H04B 7/15* (2006.01)
*H04B 1/60* (2006.01)
*H04B 7/185* (2006.01)
*H04B 7/14* (2006.01)
*H04B 7/165* (2006.01)

(52) U.S. Cl. .............. 455/11.1; 455/7; 455/9; 455/13.1; 455/18; 455/22; 455/23; 455/24

(58) Field of Classification Search ............. 455/7, 11.1, 455/9, 13.1, 18, 22, 23, 24
See application file for complete search history.

(56) References Cited

U.S. PATENT DOCUMENTS

| 6,049,315 | A | 4/2000 | Meyer ............................ 343/895 |
| 6,385,435 | B1* | 5/2002 | Lee ................................... 455/24 |
| 6,904,266 | B1* | 6/2005 | Jin et al. ........................... 455/20 |
| 7,624,419 | B2* | 11/2009 | Shibusawa ..................... 725/119 |
| 2002/0077068 | A1* | 6/2002 | Dent ................................ 455/82 |
| 2003/0052834 | A1* | 3/2003 | Sievenpiper et al. ......... 343/909 |
| 2003/0214438 | A1* | 11/2003 | Hatch et al. ............ 343/700 MS |
| 2004/0166802 | A1* | 8/2004 | McKay et al. .................. 455/15 |
| 2005/0129035 | A1* | 6/2005 | Saito ............................. 370/401 |
| 2006/0205341 | A1* | 9/2006 | Runyon ...................... 455/11.1 |
| 2006/0205342 | A1* | 9/2006 | McKay et al. ............... 455/11.1 |
| 2006/0205343 | A1* | 9/2006 | Runyon et al. .............. 455/11.1 |
| 2008/0132165 | A1* | 6/2008 | Kho et al. .................... 455/11.1 |
| 2010/0045515 | A1* | 2/2010 | Walker et al. ................. 342/354 |

FOREIGN PATENT DOCUMENTS

| EP | 1 445 876 A1 | 10/2004 |
| JP | 02-174321 | 7/1990 |
| JP | 06-120852 | 4/1994 |
| JP | 07-307618 | 11/1995 |

(Continued)

*Primary Examiner* — Bobbak Safaipour
(74) *Attorney, Agent, or Firm* — Cha & Reiter, LLC

(57) ABSTRACT

A radio frequency repeater is provided. A donor antenna transmits a signal to and receives a signal from a base station. A service antenna transmits a signal to and receives a signal from a mobile station. A repeater filters and amplifies a signal between the two antennas. A polarization variation unit variably selects a polarization direction of at least one of the donor antenna and the service antenna in response to a detection signal of an isolation detector for detecting isolation between the two antennas. The isolation between the donor antenna and the service antenna can be sufficiently ensured.

4 Claims, 4 Drawing Sheets

FOREIGN PATENT DOCUMENTS

| | | |
|---|---|---|
| JP | 09-200842 | 7/1997 |
| JP | 10-004313 | 1/1998 |
| JP | 2000-138625 | 5/2000 |
| JP | 2000-196340 | 7/2000 |
| JP | 2000-269727 | 9/2000 |
| JP | 2001-077739 | 3/2001 |
| JP | 2004-128719 | 4/2004 |
| JP | 2005-072646 | 3/2005 |
| JP | 2005-192185 | 7/2005 |
| KR | 2000-50256 | 8/2000 |
| KR | 2004-18034 | 3/2004 |

* cited by examiner

[Fig. 2]
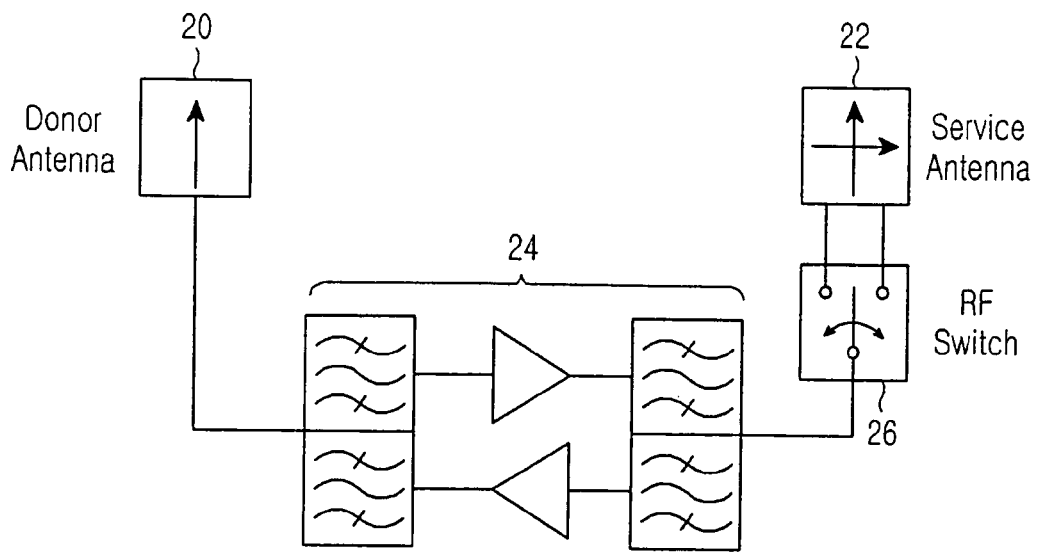
[Fig. 3]
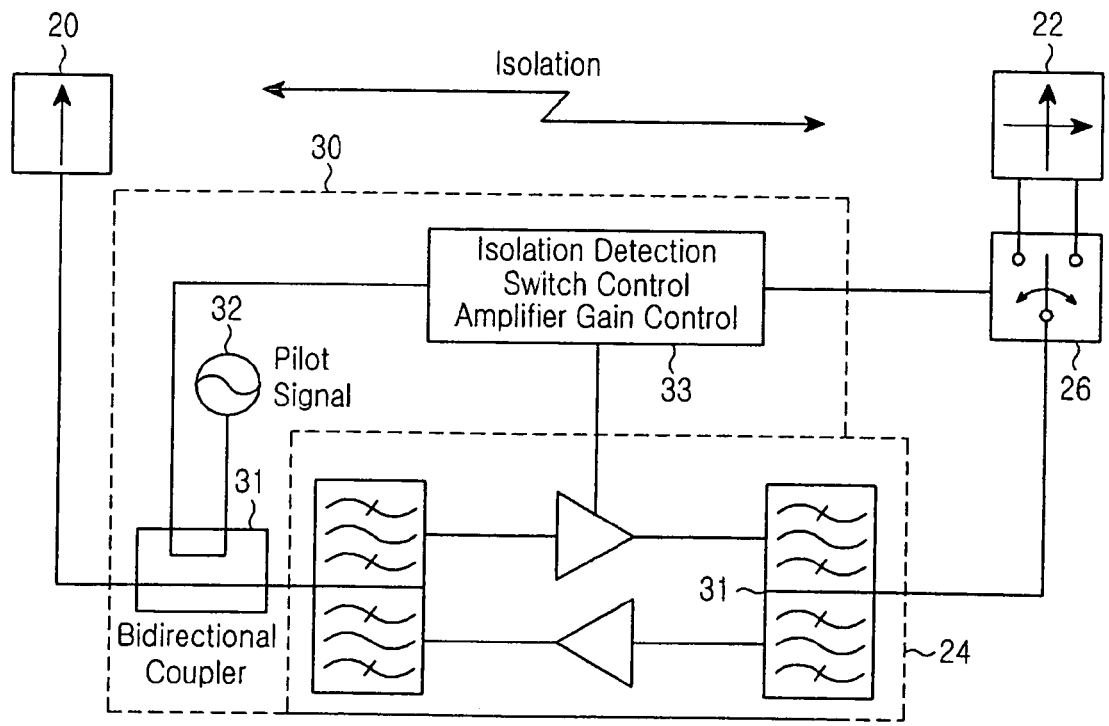

[Fig. 4]
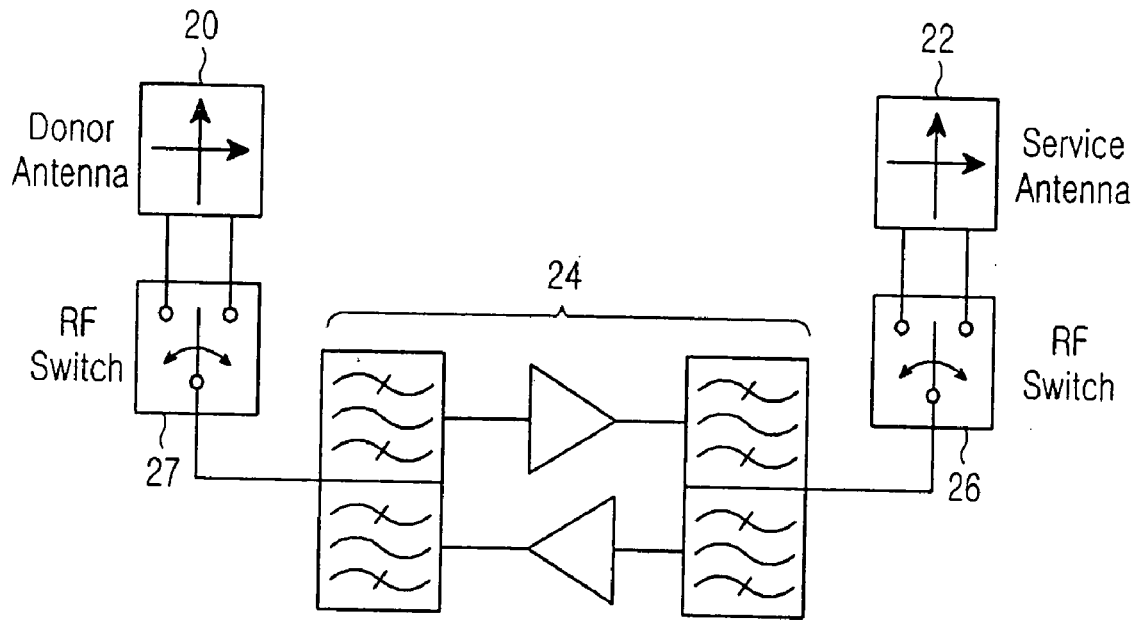
[Fig. 5]
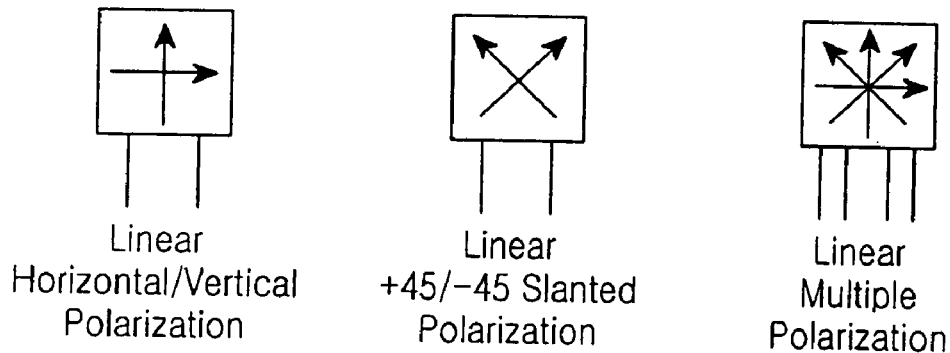
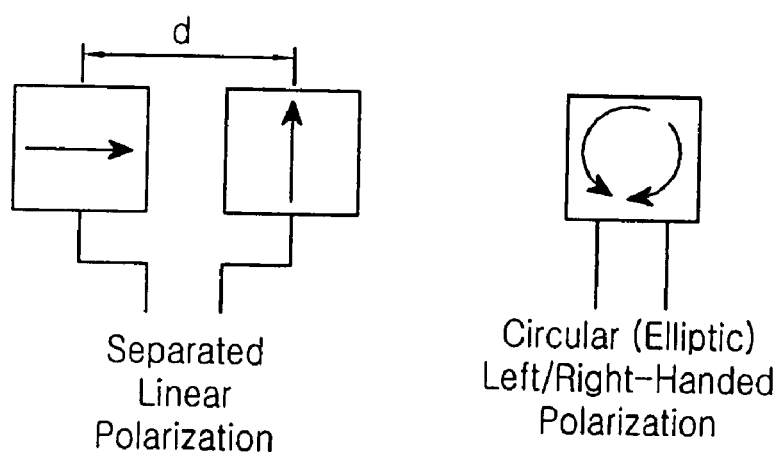

[Fig. 6]
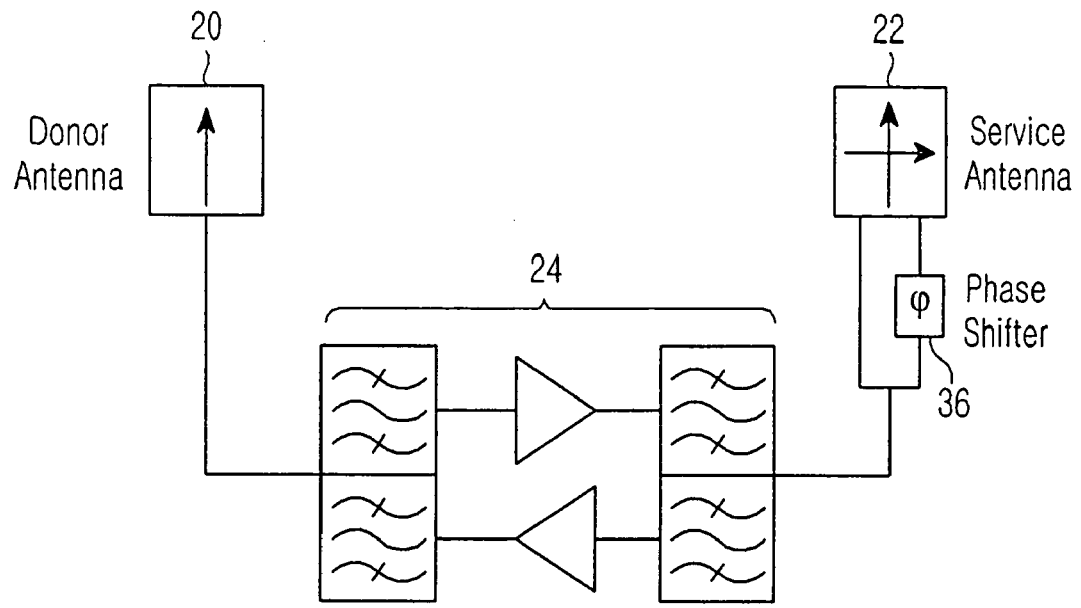
[Fig. 7]
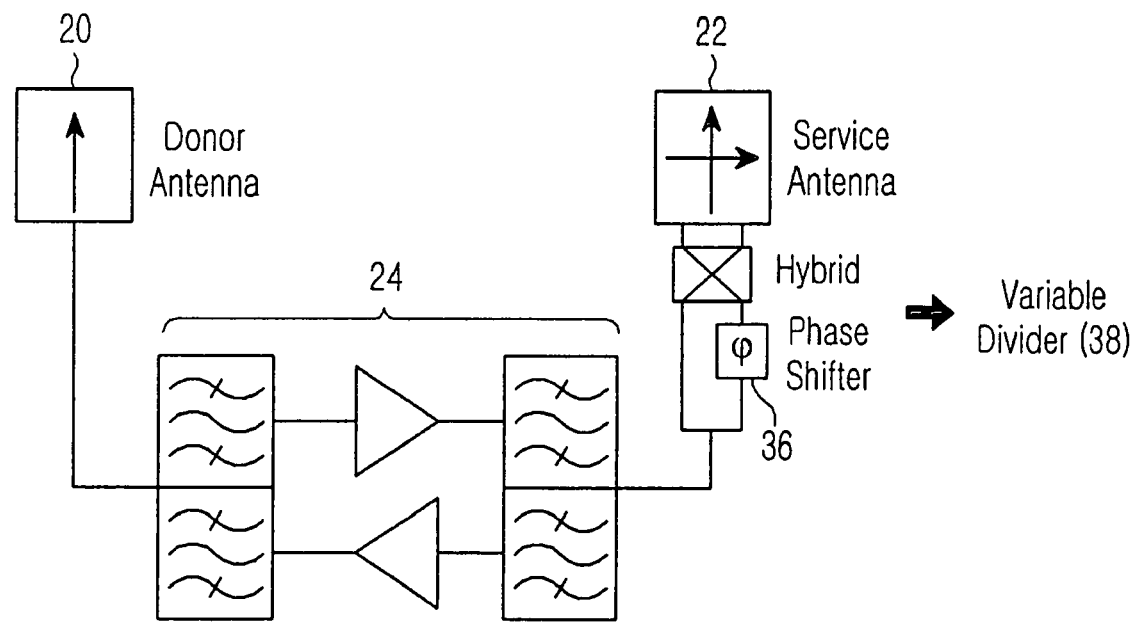

RF REPEATER

CLAIM OF PRIORITY

The present application is a continuation of international application PCT/KR2006/005698 filed on Dec 26, 2006, which in turn claims a priority to a Korean Patent Application 10-2005-0129810, filed on Dec. 26, 2005.

TECHNICAL FIELD

The present invention generally relates to a repeater for use in mobile communication and broadcast systems, and more particularly to a radio frequency repeater that can sufficiently ensure isolation between a donor antenna and a service antenna.

BACKGROUND ART

Mobile communication systems are provided with a mobile switching center (MSC), a base station controller (BSC), a base transceiver station (BTS), a mobile station (MS), and the like. A communication possible area can be extended where multiple BTSs are installed. However, when a signal transmitted from the BTS is propagated over air, the signal may be weakened. Since signal strength may be further weakened due to natural and artificial obstacles such as a mountain, a building, a building underground, a tunnel, the inside of a building, and the like, there may occur a partial communication shadow zone where smooth reception of the MS is impossible. To address a problem of the communication shadow zone, a repeater is conventionally installed and used.

In mobile communication and broadcast networks, repeaters are widely used for coverage extension and electronic wave shadow zone reduction. Among the repeaters, particularly, a radio frequency (RF) repeater is inexpensive since a signal received from a base station has the same frequency as that transmitted from a mobile station. The RF repeater may be the most preferred repeater on a wireless basis since a special transmission line does not need to be constructed.

As illustrated in FIG. 1, the conventional RF repeater is provided with a donor antenna 10 for communicating with a base station 1, a service antenna 12 for communicating with a mobile station 2, and a repeater 14 for filtering and amplifying a signal between the two antennas. When isolation between the two antennas is not ensured, a signal retransmitted through the service antenna 12 after amplification is fed back to the donor antenna 10 and therefore an amplifier may oscillate. Thus, a scheme is used in which the isolation between the two antennas is maximally ensured (at 60~70 dB in a conventional case) and amplification gain is set in a range in which a power amplifier does not oscillate.

Since the oscillation of the repeater is vital to a network and a system, it is set that the amplifier gain has a higher margin of 15~20 dB than the conventional isolation. Thus, the amplifier gain is about 40~55 dB. This limits a primary function of the repeater, that is, a sufficient coverage extension or electronic wave shadow zone reduction function and is also the largest drawback of the RF repeater.

To obtain the amplifier gain of about 80 dB with sufficient utility in the RF repeater, an isolation value between the two antennas should be set to about 100 dB or more. It is difficult to satisfy the value in an actual situation.

To conventionally ensure the isolation between the two antennas in the RF repeater, there can be used an antenna for ensuring a high isolation value (of a front-to-back ratio of 40 dB or more) or a technology in which a distance between the two antennas is sufficiently spaced (by 3 m or more) or an antenna direction is adjusted.

However, there may occur problems with a weight, price, wind pressure, and the like since a size of a reflector should increase in an antenna for ensuring a high isolation value.

It is difficult to sufficiently space the two antennas upon installation. There is a problem in that a price and signal loss may increase due to the cable length.

Methods of adjusting an antenna direction and increasing an isolation value have limitations since a direction in which a signal is smoothly received from the base station and a service area direction are fixed. Moreover, there is a problem in that objectivity is lack since an isolation value when a worker adjusts the antenna direction is different from that when the worker is far away from the antenna after adjustment. Since peripheral situations differ according to place where the repeater is installed, a lot of effort is required for antenna adjustment to ensure the sufficient isolation between the two antennas upon installation of the repeater.

Peripheral situations vary with time even when the sufficient isolation is ensured upon initial installation. There is a problem in that the sufficient isolation may not be ensured in general situations since the isolation frequently varies, for example, due to variation of obstacles such as a building and the like and movement of vehicles and people.

SUMMARY OF THE INVENTION

There is a limitation in ensuring isolation between two antennas since the conventional RF repeater uses an antenna for radiating fixed polarization. Accordingly, the performance of the repeater may not be maximally used.

An aspect of exemplary embodiments of the present invention is to address at least the above problems and/or disadvantages and to provide at least the advantages described below. Accordingly, an aspect of exemplary embodiments of the present invention is to provide a radio frequency (RF) repeater that can ensure optimal isolation proper for peripheral situations of the repeater by actively varying polarization directions of electronic waves radiated from two antennas.

Moreover, an aspect of exemplary embodiments of the present invention is to provide an RF repeater in which donor and service antennas and a repeater 24 can be installed inside one radome.

In accordance with an aspect of exemplary embodiments of the present invention, there is provided an RF repeater, including: a donor antenna for transmitting a signal to and receiving a signal from a base station; a service antenna for transmitting a signal to and receiving a signal from a mobile station; a repeater for filtering and amplifying a signal between the two antennas; and a polarization variation unit for variably selecting a polarization direction of at least one of the donor antenna and the service antenna in response to a detection signal of an isolation detector for detecting isolation between the two antennas.

Optimal isolation can be ensured according to peripheral situations of the repeater by actively varying polarization radiated from the antenna.

A distance between the two antennas can be shortened since isolation can be ensured in a method of varying polarization.

A size can be reduced since all of the donor and service antennas and the repeater can be installed in one radome.

DESCRIPTION OF DRAWINGS

FIG. 2 is a block diagram in accordance with a first exemplary embodiment of the present invention;

FIG. 3 is a block diagram in which a conventional isolation detector is included in FIG. 2;

FIG. 4 is a block diagram in which a switch is further included in FIG. 2;

FIG. 5 illustrates types of polarization directions of antennas in FIG. 2;

FIG. 6 is a block diagram in accordance with a second exemplary embodiment of the present invention; and FIG. 7 is a block diagram in accordance with a third exemplary embodiment of the present invention.

DESCRIPTION OF THE INVENTION

Figure 1:
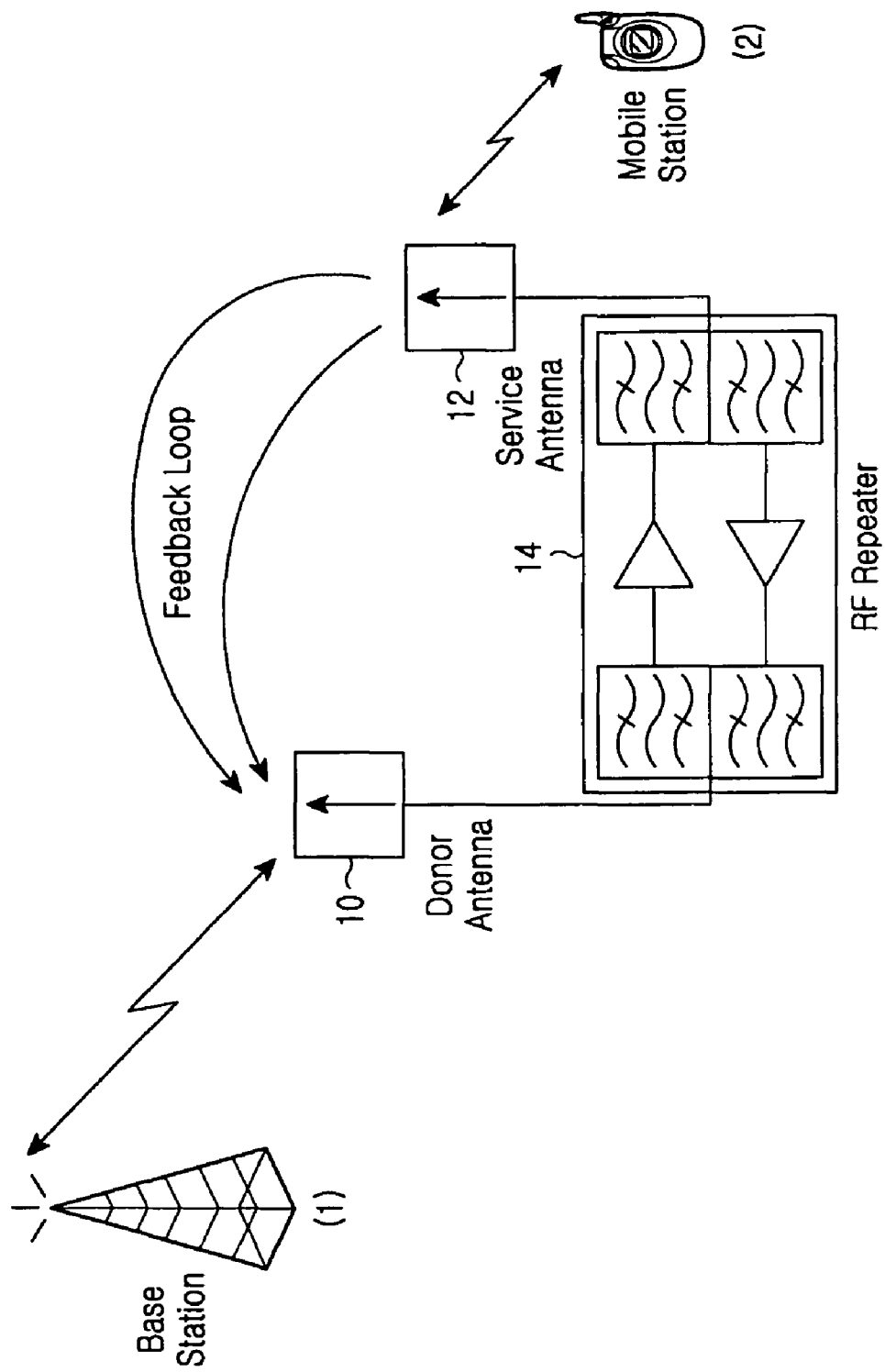
FIG. 1 is a block diagram illustrating a conventional RF repeater.

Exemplary embodiments of the present invention will be described in detail herein below with reference to the accompanying drawings.

FIG. 2 is a block diagram in accordance with a first exemplary embodiment of the present invention. As illustrated in FIG. 2, there are provided a donor antenna 20 for transmitting a signal to and receiving a signal from a base station, a service antenna 22 for transmitting a signal to and receiving a signal from a mobile station, a repeater 24 for filtering and amplifying a signal between the two antennas, and a first switch 26 for variably selecting a polarization direction of the service antenna 22.

The first switch 26 performs a switching operation in response to a detection signal of a conventional isolation detector (not illustrated) for detecting isolation between the two antennas.

In a basic operation, a signal received through the donor antenna 20 is filtered and amplified in the repeater 24 and is radiated to a service area through the service antenna 22.

In contrast, a signal radiated from the mobile station of the service area is received through the service antenna 22. The received signal is filtered and amplified in the repeater 24 and is transmitted to the base station through the donor antenna 20. Conventionally, polarization directions of the donor antenna 20 and the service antenna 22 are equally fixed. However, the service antenna 22 can be constructed to have two horizontal and vertical polarization directions in accordance with an exemplary embodiment of the present invention. The first switch 26 can be constructed to select a polarization direction.

That is, a polarization direction with high isolation can be selected in response to a signal detected by the conventional isolation detector.

In general, an isolation detector 30 may be illustrated as in FIG. 3. However, an isolation detector is not illustrated in an exemplary embodiment of the present invention since the isolation detector 30 can be implemented in various methods. Thus, the present invention is not limited to a specific structure.

Referring to an example as illustrated in FIG. 3, in the isolation detection operation of the conventional isolation detector 30, a bidirectional coupler 31 connected to an input terminal of the repeater 24 couples a pilot signal generated from a pilot signal source 32 to a signal received through the donor antenna 20, such that the pilot signal coupled to the received signal can be radiated through the service antenna 22. Then, an isolation detection controller 33 detects a signal fed back from the service antenna 22 through the bidirectional coupler 31 and detects an amount of a pilot signal carried on the fed-back signal. When the pilot signal carried on the fed-back signal is compared with the first inserted pilot signal, isolation can be measured using a difference value. However, an isolation detection method may not necessarily use the pilot signal.

In response to an output signal of the isolation detector, a switching operation can be implemented in many methods.

After the switching operation is performed at predetermined time intervals and isolations in vertical and horizontal polarization directions are detected, the isolations are compared to each other. The final switching operation can be performed in the direction with the higher isolation.

When a reference value is set, an isolation value of a current set is compared to the set reference value. If the isolation value is less than the reference value, the switching operation can be performed.

The first switch 26 can use electrical, mechanical and electromechanical switches.

On the other hand, the two antennas are not limited to a structure with the vertical and horizontal polarization directions. That is, the antennas can be constructed to have a polarization direction slanted at an angle of 45 degrees, multiple polarization directions, a separated polarization direction, and a circular polarization direction.

When the antennas are changed to a structure capable of radiating multiple polarizations, the switch 26 is constructed with a switching structure capable of selecting a polarization direction.

FIG. 4 illustrates a structure capable of selecting not only a polarization direction of the service antenna but also a polarization direction of the donor antenna by adding a second switch 27 in FIG. 2.

FIG. 6 illustrates a block diagram in accordance with a second exemplary embodiment of the present invention. As illustrated in FIG. 6, there are provided a donor antenna 20 for transmitting a signal to and receiving a signal from a base station, a service antenna 22 for transmitting a signal to and receiving a signal from a mobile station, a repeater 24 for filtering and amplifying a signal between the two antennas, and a phase controller (or phase shifter) 36 for varying a polarization direction by varying a phase of a signal to be transmitted to the service antenna 22. The phase controller 36 operates in response to a detection signal of a conventional detector for detecting isolation between the two antennas.

The second exemplary embodiment of the present invention is implemented by controlling a phase of a signal to be transmitted to each antenna using the phase shifter 36 when polarization directions of the two antennas are selected.

When the above-described phase control is used, polarization can be set in various shapes and directions. Alternatively, continuous polarization can be set without switching using the switch.

The phase shifter 36 can be installed in not only the service antenna 22 but also the donor antenna 20. Alternatively, at least one phase shifter can be installed.

FIG. 7 illustrates a block diagram in accordance with a third exemplary embodiment of the present invention. As illustrated in FIG. 7, there are provided a donor antenna 20 for transmitting a signal to and receiving a signal from a base station, a service antenna 22 for transmitting a signal to and receiving a signal from a mobile station, a repeater 24 for filtering and amplifying a signal between the two antennas, and a variable divider 38 for varying a polarization direction by controlling a division ratio of a signal to be transmitted to the service antenna 22.

The variable divider 38 operates in response to a detection signal of a conventional detector for detecting isolation between the two antennas.

The third exemplary embodiment of the present invention is implemented by controlling a division ratio of a signal to be transmitted to each antenna using the variable divider 38 when polarization directions of the two antennas are selected. In the exemplary embodiment of the present invention, the variable divider 38 can be constructed with the phase shifter 36 and a hybrid coupler. However, the present invention is not limited to the structure of the variable divider 38. Alternatively, the variable divider 38 can be installed in the donor antenna 20.

In the first to third exemplary embodiments, an operation for varying a polarization direction of an antenna can enable a polarization direction with a highest isolation value and can be performed to have an average isolation value by continuously varying the polarization direction in a predetermined period.

When the polarization direction of the antenna is varied, a space distance between the donor antenna and the service antenna can be reduced and the donor antenna, the service antenna and the repeater 24 can be installed inside one radome.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

The invention claimed is:

1. A radio frequency (RF) repeater, comprising:
   a donor antenna for transmitting a signal to and receiving a signal from a base station;
   a service antenna for transmitting a signal to and receiving a signal from a mobile station;
   a repeater for filtering and amplifying a signal between the two antennas;
   an isolation detector for detecting an isolation level between the donor antenna and the service antenna and generating a detection signal according to the detection;
   a polarization variation unit for selecting a polarization direction of at least one of the donor antenna and the service antenna based on the detection signal, by
      continuously varying a polarization direction between the two antennas during a predetermined period, to attain a highest isolation level;
   wherein the polarization variation unit is constructed with at least one of a switch, a phase controller and a variable divider, the switch variably selects the polarization direction of the at least one of the donor antenna and the service antenna by performing a switching operation in response to the detection signal of the isolation detector, the phase controller varies the polarization direction by varying a phase of a signal to be transmitted to the at least one of the donor antenna and the service antenna in response to the detection signal of the isolation detector, and the variable divider varies the polarization direction by controlling a division ratio of the signal to be transmitted to the at least one of the donor antenna and the service antenna in response to the detection signal of the isolation detector.

2. The RF repeater of claim 1, wherein the repeater is installed inside one radome.

3. The RF repeater of claim 1, wherein a first polarization direction is selected as one of: a horizontal polarization, a vertical polarization, an angular slanted polarization, a right-hand circular polarization, and a left-hand circular polarization.

4. The RF repeater of claim 3, wherein a second polarization direction is oriented with respect to the selected first polarization direction.

* * * * *